US007385665B2

(12) United States Patent
Matsumoto

(10) Patent No.: US 7,385,665 B2
(45) Date of Patent: Jun. 10, 2008

(54) DISPLAY DEVICE

(75) Inventor: Tomohiro Matsumoto, Kumagaya (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 0 days.

(21) Appl. No.: 11/553,274

(22) Filed: Oct. 26, 2006

(65) Prior Publication Data
US 2007/0097309 A1 May 3, 2007

(30) Foreign Application Priority Data
Oct. 31, 2005 (JP) ............... 2005-317079

(51) Int. Cl.
*H05K 1/00* (2006.01)
(52) U.S. Cl. ............... 349/150; 349/149; 349/33; 439/55; 439/951; 174/250; 257/59
(58) Field of Classification Search .......... 349/150, 349/149, 33; 174/250, 255; 345/88; 257/59; 439/55, 951
See application file for complete search history.

(56) References Cited

U.S. PATENT DOCUMENTS

| 6,583,845 | B1 * | 6/2003 | Chung et al. ............... 349/150 |
| 2001/0026345 | A1 * | 10/2001 | Park et al. ............... 349/149 |
| 2004/0036833 | A1 | 2/2004 | Monzen |
| 2005/0162577 | A1 * | 7/2005 | Yoon et al. ............... 349/33 |
| 2006/0086532 | A1 * | 4/2006 | Ho et al. ............... 174/250 |
| 2006/0118786 | A1 * | 6/2006 | Kim et al. ............... 257/59 |
| 2006/0232533 | A1 * | 10/2006 | Miyazawa ............... 345/88 |
| 2007/0085960 | A1 * | 4/2007 | Kim ............... 349/149 |

FOREIGN PATENT DOCUMENTS

| JP | 2005-241852 | 9/2005 |
| KR | 2001-0083972 | 9/2001 |
| KR | 2004-0018201 | 3/2004 |

* cited by examiner

*Primary Examiner*—Gary F. Paumen
(74) *Attorney, Agent, or Firm*—Oblon, Spivak, McClelland, Maier & Neustadt, P.C.

(57) ABSTRACT

A display device includes a display panel which includes an effective display section, a flexible board which supplies a driving signal to the effective display section, a connection part at which the display panel and the flexible board are connected, and a plurality of connection wiring lines which connect the connection part and the effective display section. The connection part includes a first connection section including at least two connection pad groups, which are composed of connection pads that are connected to the effective display section via the connection wiring lines, and a dummy pad group which is disposed between the connection pad groups, and is composed of dummy pads, and a second connection section including connection terminal groups, which are composed of connection terminals corresponding to the connection pads, and a dummy terminal group which is composed of dummy terminals corresponding to the dummy pads.

4 Claims, 7 Drawing Sheets

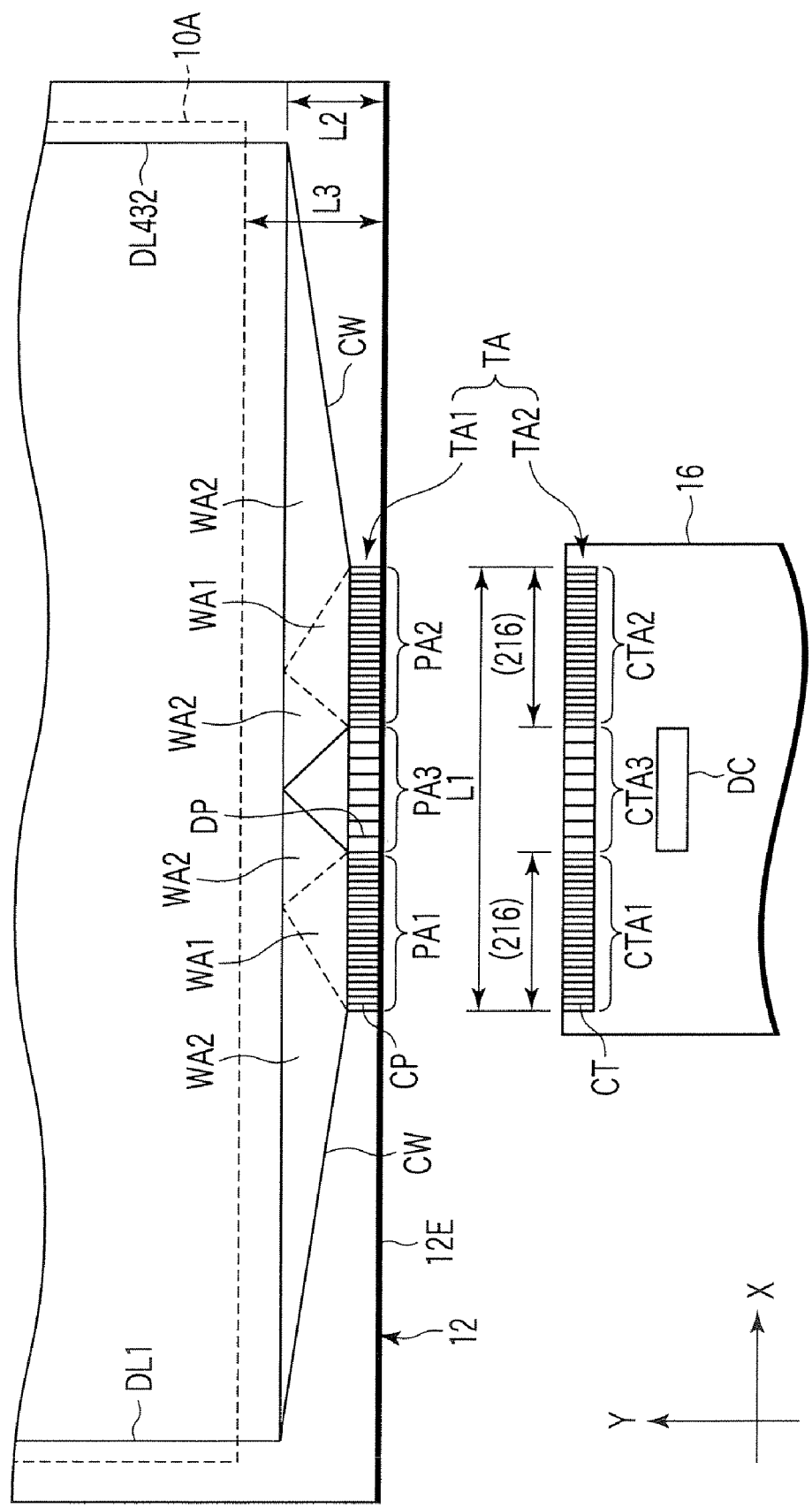
F I G. 4

DISPLAY DEVICE

CROSS-REFERENCE TO RELATED APPLICATIONS

This application is based upon and claims the benefit of priority from prior Japanese Patent Application No. 2005-317079, field Oct. 31, 2005, the entire contents of which are incorporated herein by reference.

BACKGROUND OF THE INVENTION

1. Field of the Invention

The present invention relates generally to a display device, and more particular to an active-matrix display device.

2. Description of the Related Art

In general, a display device includes a display panel having an effective display section in which a plurality of display pixels are arranged. The display panel includes a plurality of scanning lines for selecting the display pixels, and a plurality of signal lines for supplying image signals to the selected display pixels. A driving IC, which supplies driving signals to the signal lines and scanning lines, has the same number of driving signal output lines as the number of the signal lines and scanning lines.

In recent years, liquid crystal display devices, for instance, have widely been used as display devices. In order to meet a demand to accommodate a display panel in a limited space within the housing of the device and a demand to increase the amount of information to be displayed, such a structure has been desired that the display region is increased as large as possible while the picture-frame-shaped region of the display device is reduced in size.

As a method for decreasing the size of the picture-frame-shaped region of the display device, there has been proposed in the prior art a method in which the positional relationship between the driving IC, a flexible board and their lead lines is improved (see Jpn. Pat. Appln. KOKAI Publication No. 11-305254).

However, even if the positional relationship between the driving IC, etc. is improved as in the above-mentioned liquid crystal display device, an increase in the number of signal lines and scanning lines leads to an increase in length of connection wiring between the flexible board and the signal lines, etc. As a result, the size of the picture-frame-shaped region of the display device would increase.

In addition, there is a limit to the length of the connection part between the flexible board and an array substrate of the display device in the direction in which connection terminals are arranged. Thus, if connection terminals, the number of which is equal to that in the prior art, are disposed with a pitch less than in the prior art, a region where there is no connection terminal would occur on the connection part. In this case, when the flexible board is thermal press-bonded to the array substrate, defective connection of the flexible board may occur in the region where there is no connection terminal.

BRIEF SUMMARY OF THE INVENTION

The present invention has been made in consideration of the above-described problem, and the object of the invention is to provide a display device which enables reduction in size of a picture-frame-shaped region and prevents defective connection of a flexible board.

According to an aspect of the present invention, there is provided a display device comprising: a display panel which includes an effective display section on which an image is displayed; a driving signal source which supplies a driving signal to the effective display section; a connection part at which the display panel and the driving signal source are connected; and a plurality of connection wiring lines which connect the connection part and the effective display section, the connection part comprising: a first connection section including at least two connection pad groups which are composed of connection pads that are connected to the effective display section via the connection wiring lines, and a dummy pad group which is disposed between the at least two connection pad groups and is composed of dummy pads; and a second connection section including connection terminal groups which are composed of connection terminals corresponding to the connection pads, and a dummy terminal group which is composed of dummy terminals corresponding to the dummy pads.

The present invention can provide a display device which enables reduction in size of a picture-frame-shaped region and prevents defective connection of a flexible board.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a view for describing an example of the structure of the connection part between the array substrate and flexible board of the liquid crystal display panel shown in FIG. 1;

DETAILED DESCRIPTION OF THE INVENTION

Figure 1:
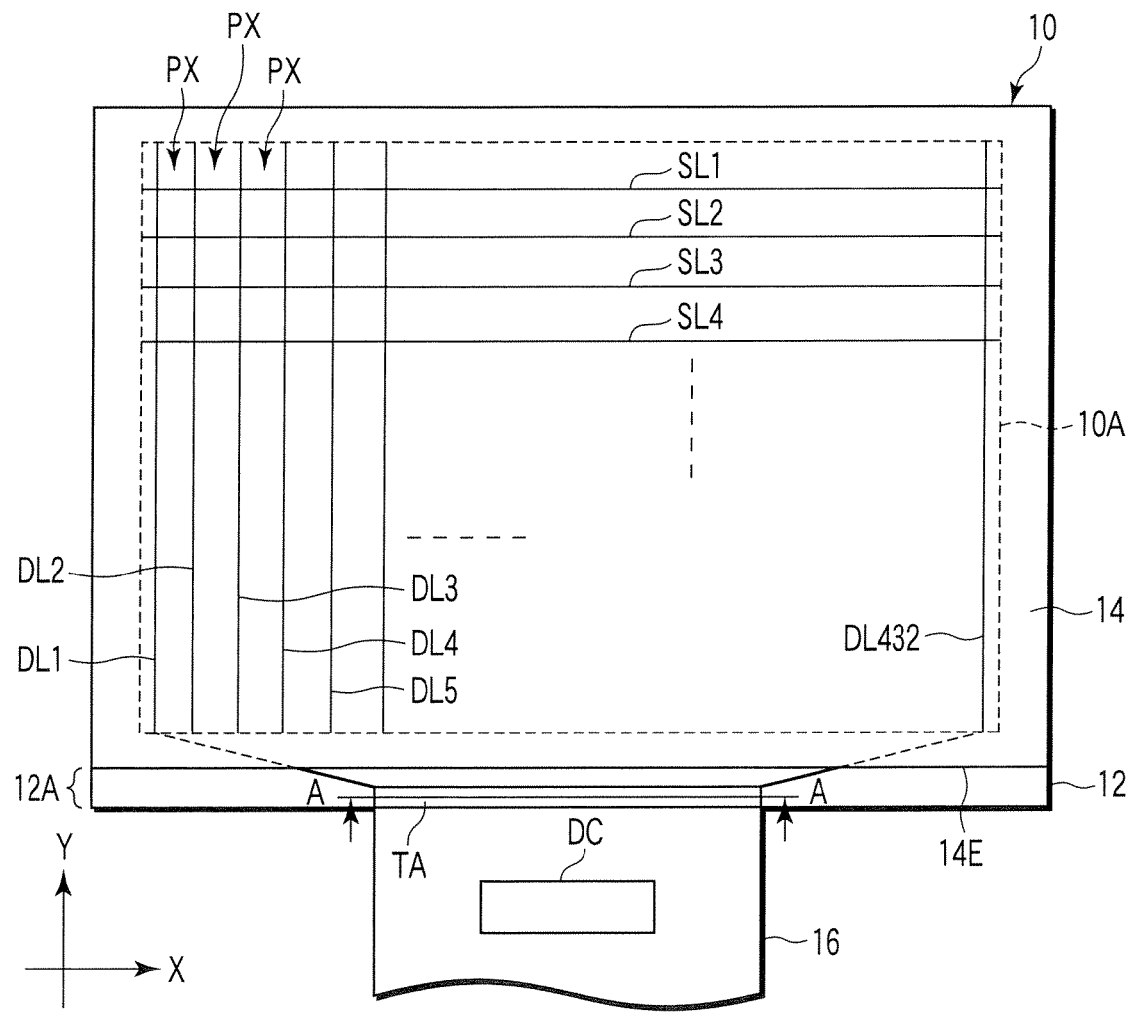
FIG. 1 is a plan view that schematically shows an example of a liquid crystal display panel of a liquid crystal display device according to an embodiment of the present invention.

As is shown in FIG. 1, a liquid crystal display device, which serves as a display device, includes a liquid crystal display panel 10 having an effective display section 10A which displays an image.

The liquid crystal display panel 10 includes a pair of mutually opposed substrates, that is, an array substrate 12 and a counter-substrate 14, and a liquid crystal layer (not shown) which is held between the array substrate 12 and counter-substrate 14. The effective display section 10A is composed of a plurality of display pixels PX which are arrayed in a matrix.

On the array substrate 12, a plurality of scanning lines SL (SL1 to SLm) are disposed along the rows of display pixels PX, and a plurality of signal lines DL (DL1 to DLn) are disposed along the columns of display pixels PX. In the example shown in FIG. 1, 432 signal lines are disposed on the array substrate 12.

The array substrate 12 includes an extension part 12A which extends from a position where the array substrate 12 is opposed to an edge portion 14E of the counter-substrate 14. A connection part TA, to which a driving signal source that supplies a driving signal to the effective display section 10A is connected, is disposed on the extension part 12A. Specifically, a flexible board 16, which functions as the driving signal source, is connected to the connection part TA. A driving circuit DC is mounted on the flexible board.

Figure 2:
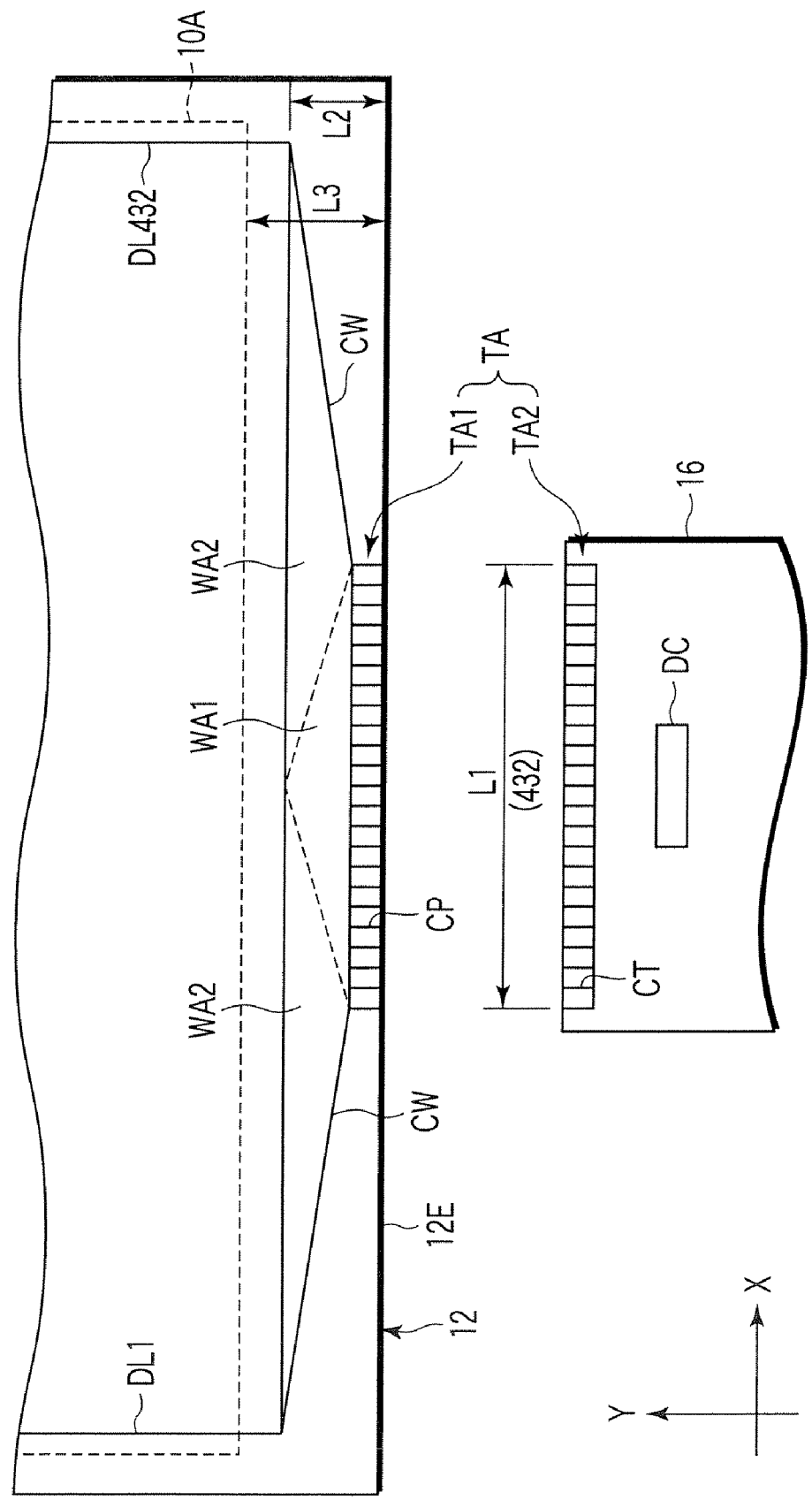
FIG. 2 is a view for describing an example of the structure of a connection part between an array substrate of the liquid crystal display panel and a flexible board.

As is shown in FIG. 2, a first connection section TA1 of the array substrate 12 and a second connection section TA2 of the flexible board 16 are connected at the connection part TA. The first connection section TA1 of the array substrate 12 includes a plurality of connection pads CP which are connected to the effective display section 10A by connection wiring lines CW. In the example shown in FIG. 2, the first connection section TA1 includes 432 connection pads CP which are connected to connection wiring lines extending to the 432 signal lines.

The array substrate 12 includes a wiring region WA on which the connection wiring lines CW are disposed. The wiring region WA includes a first wiring region WA1 in which connection wiring lines CW extend in a direction (Y direction) which is substantially perpendicular to an edge portion 12E of the array substrate 12, and a second wiring region WA2 in which connection wiring lines CW extend from the first wiring region WA1 toward the signal lines DL. In the example shown in FIG. 2, the second wiring region WA2 extends from an end portion of the first connection section TA1 in a widening fashion toward both end portions in an X direction of the effective display section 10A.

Connection terminals CT, which correspond to the connection pads CP of the first connection section TA1, are disposed on the second connection section TA2 of the flexible board 16. Specifically, in the example shown in FIG. 2, 432 connection terminals CT, which correspond to the 432 connection pads CP of the first connection section TA1, are disposed on the second connection section TA2 with the same pitch as the pitch of arrangement of the connection pads CP.

If the connection part TA and the connection wiring lines CW are arranged as described above, a Y-directional length L2 of the first wiring region WA1 and second wiring region WA2 increases. As a result, a Y-directional length L3 between the edge portion 12E of the array substrate 12 and the effective display section 10A increases.

Figure 3A:
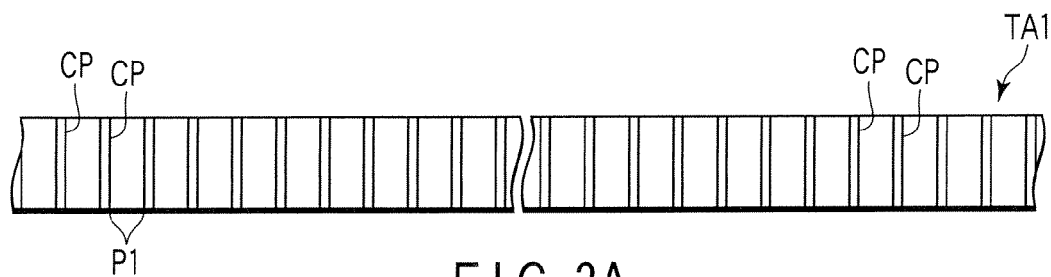
FIG. 3A is a view for describing an example of arrangement of connection pads of the connection part of the array substrate shown in FIG. 2.
Figure 3B:
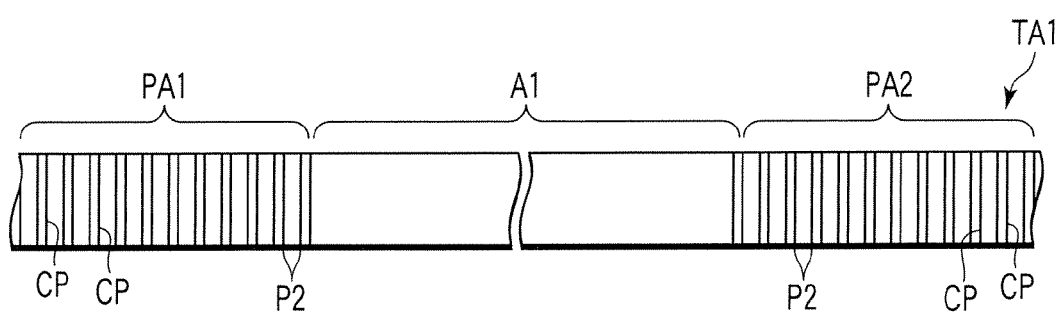
FIG. 3B is a view for describing an example of arrangement of the connection pads in a case where the pitch of arrangement of the connection pads is decreased in the connection part shown in FIG. 2.

To cope with this problem, the pitch of arrangement of connection pads CP on the liquid crystal display panel 10 shown in FIG. 1 and FIG. 2 is decreased. For example, on the liquid crystal display panel 10 shown in FIG. 1 and FIG. 2, the connection pads CP are arranged with a pitch P1 as shown in FIG. 3A. By decreasing the pitch P1, the connection pads CP are arranged with a pitch P2 (P1>P2) as shown in FIG. 3B. In this case, the connection pads CP comprises two connection pad groups, that is, a first connection pad group PA1 and a second connection pad group PA2. The first and second connection pad groups PA1 and PA2 are disposed on both end portions of the first connection section TA1.

Accordingly, as shown in FIG. 4, the pitch of arrangement of the connection terminals CT of the flexible substrate 16, which correspond to the connection pads CP, decreases, and two connection terminal groups, that is, a first connection terminal group CTA1 and a second connection terminal group CTA2, are disposed on both end portions of the second connection section TA2 of the flexible board 16.

To be more specific, as shown in FIG. 4, the array substrate 12 and flexible board 16 are arranged such that the first connection pad group PA1 of the array substrate 12 is opposed to the first connection terminal group CTA1 of the flexible board 16, and the second connection pad group PA2 of the array substrate 12 is opposed to the second connection terminal group CTA2 of the flexible board 16.

As described above, if the pitches of the connection pads CP and connection terminals CT are decreased and the connection pad groups and connection terminal groups are disposed on end portions in the X direction of the connection part TA, the connection wiring lines CW extend from the respective connection pad groups to the right and left directions.

Specifically, as shown in FIG. 4, the second wiring region WA2, which extends from the first connection pad group PA1, includes connection wiring lines CW which extend from the first wiring region WA1 to the left toward the effective display section 10A, and connection wiring lines CW which extend from the first connection pad group PA1 to the right toward the effective display section 10A.

Similarly, the second wiring region WA2, which extends from the second connection pad group PA2, includes connection wiring lines CW which extend from the first connection region WA1 to the left and right toward the effective display section 10A.

Accordingly, there are provided not only a region where the connection wiring lines CW extend toward the end portions in the X direction of the array substrate 12, but also a region where the connection wiring lines CW extend toward the center of the array substrate 12. Thus, the number of connection wiring lines CW, which extend toward the end portions in the X direction of the effective display section 10A, decreases. Hence, the length L2 in the Y direction of the first wiring region WA1 and second wiring region WA2 can be decreased, and as a result the distance L3 between the edge portion 12E of the array substrate 12 and the effective display section 10A can be decreased.

The X-directional length of the second connection section TA2 of the flexible board 16 is limited. Thus, if the pitch of arrangement of the connection pads CP is decreased as described above, a region A1, where no connection pad CP is disposed, is formed on the first connection section TA1, as shown in FIG. 3B. Accordingly, a region A2 (corresponding to CTA3 in FIG. 4 to FIG. 6), where no connection terminal CT is disposed, is formed on the second connection section TA2 of the flexible board 16 in association with the region A1 where no connection pad CP is disposed.

In this case, if the flexible board 16 is thermal press-bonded on the array substrate 12, a thermal distribution on the connection part TA becomes non-uniform, leading to possible defective connection. To cope with this problem, as shown in FIG. 3C, a plurality of dummy pads DP, which are not connected to the connection wiring lines CW, are disposed on the region A1 where no connection pad CP is disposed.

Figure 5A:
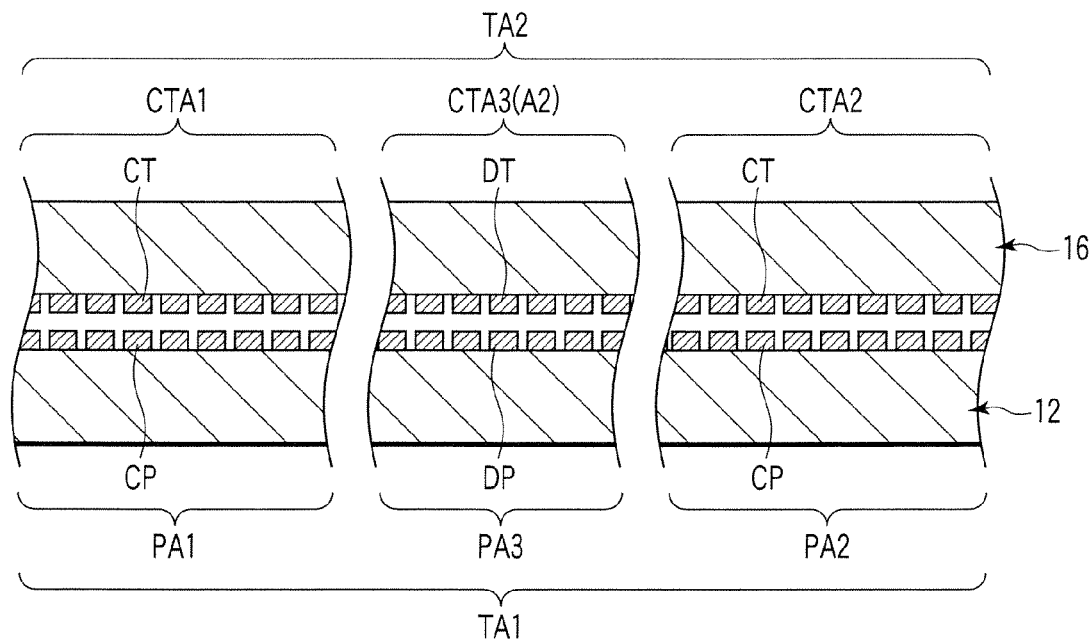
FIG. 5A is a cross-sectional view, taken along line A-A in FIG. 1, showing an example of the cross-sectional structure of the liquid crystal display panel shown in FIG. 4.

Specifically, as shown in FIG. 5A, in the first connection part TA1, there are provided the first and second connection pad groups PA1 and PA2, which are composed of the connection pads CP, and a third connection pad group PA3 which is disposed between the first connection pad group PA1 and second connection pad group PA2 and is composed of dummy pads DP.

Figure 3C:
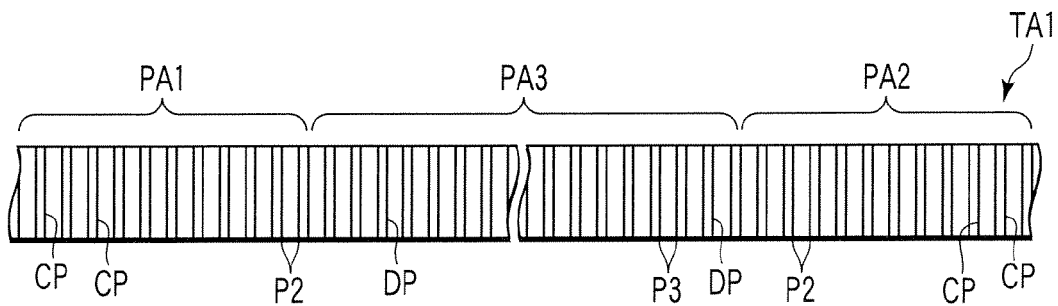
FIG. 3C shows in detail an example of the structure of the connection part of the array substrate shown in FIG. 2.

In this case, as shown in FIG. 3C, a pitch P3 of the dummy pads DP is equal to the pitch P2 of the connection pads CP. In accordance with this, in the second connection section TA2 of the flexible board 16, as shown in FIG. 5A, dummy terminals DT, which are opposed to the dummy pads DP, are disposed on the region A2 where no connection terminal CT is disposed, which is interposed between the first connection terminal group CTA1 and second connection terminal group CTA2.

Figure 6:
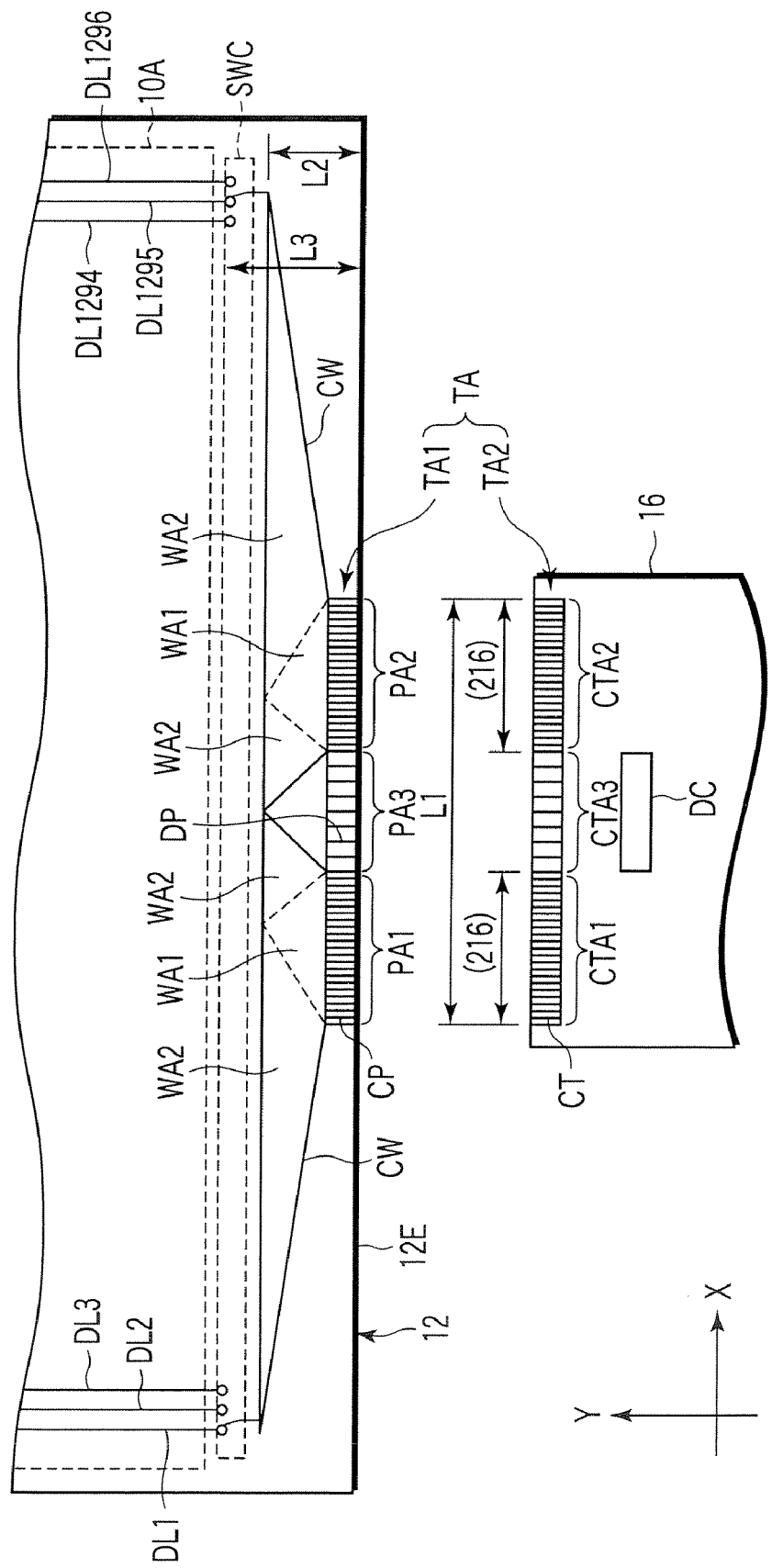
FIG. 6 shows an Example of the liquid crystal display device according to the embodiment of the present invention.

To be more specific, as shown in FIG. 6, in the second connection part TA2, there are provided the first and second connection terminal groups CTA1 and CTA2, which are composed of the connection terminals CT, and a third connection terminal group CTA3 which is disposed between the first connection terminal group CTA1 and second connection terminal group CTA2 and is composed of dummy terminals DT.

As described above, the third connection pad group PA3 comprising the dummy pads DP is disposed between the first and second connection pad groups PA1 and PA2 which are structural components of the first connection section TA1, and the third connection terminal group CTA3 comprising the dummy terminals DT is disposed between the first and second connection terminal groups CTA1 and CTA2 which are structural components of the second connection section TA2. Thereby, even if the pitch of arrangement of the connection pads CP is decreased, the thermal distribution at the time of thermal press-bonding can be made uniform and defective connection can be prevented.

An Example of the present invention and a Comparative Example of the invention will now be described. Each of liquid crystal display panels according to the Example and Comparative Example includes an effective display section 10A having an X-directional length of 331 mm, 432 connection pads CP and 432 connection terminals CT. In addition, the X-directional length L1 of the second connection section TA2 of the flexible board 16 is 39 mm.

The liquid crystal display device according to the Example includes a liquid crystal display panel 10 as shown in FIG. 6. Specifically, connection wiring lines CW are connected to the signal lines DL via a switch circuit SWC which includes switching elements that are formed by using polysilicon. In the Example, 432 connection wiring lines CW are connected to 1296 signal lines DL (DL1 to DL1296) via the switch circuit SWC.

Except for the above-described respects, this liquid crystal display panel 10 is the same as the liquid crystal display panel shown in FIG. 1. Thus, the common parts are denoted by like reference numerals, and a description thereof is omitted. As shown in FIG. 4, the array substrate 12 includes first to third connection pad groups PA1, PA2 and PA3. The number of connection pads CP of each of the first and second connection pad groups PA1 and PA2 is 216, and these connection pads CP are arranged with a pitch of 65 μm. In the third connection pad group PA3, 118 dummy pads DP are arranged with a pitch of 65 μm.

The second connection section TA2 of the flexible board 16 includes first to third connection terminal groups CTA1, CTA2 and CTA3 in association with the first connection section TA1. In the first and second connection terminal groups CTA1 and CTA2, connection terminals are arranged with the same pitch as the pitch of the connection pads. In the third connection terminal group CTA3, dummy terminals DT are arranged with the same pitch as the pitch of the dummy pads DP.

In this case, the Y-directional length L2 of each of the first wiring region WA1 and second wiring region WA2 was 5.3 mm, and the Y-directional length L3 between the edge portion 12E of the array substrate 12 and the effective display section 10A was about 5.8 mm.

Figure 7:
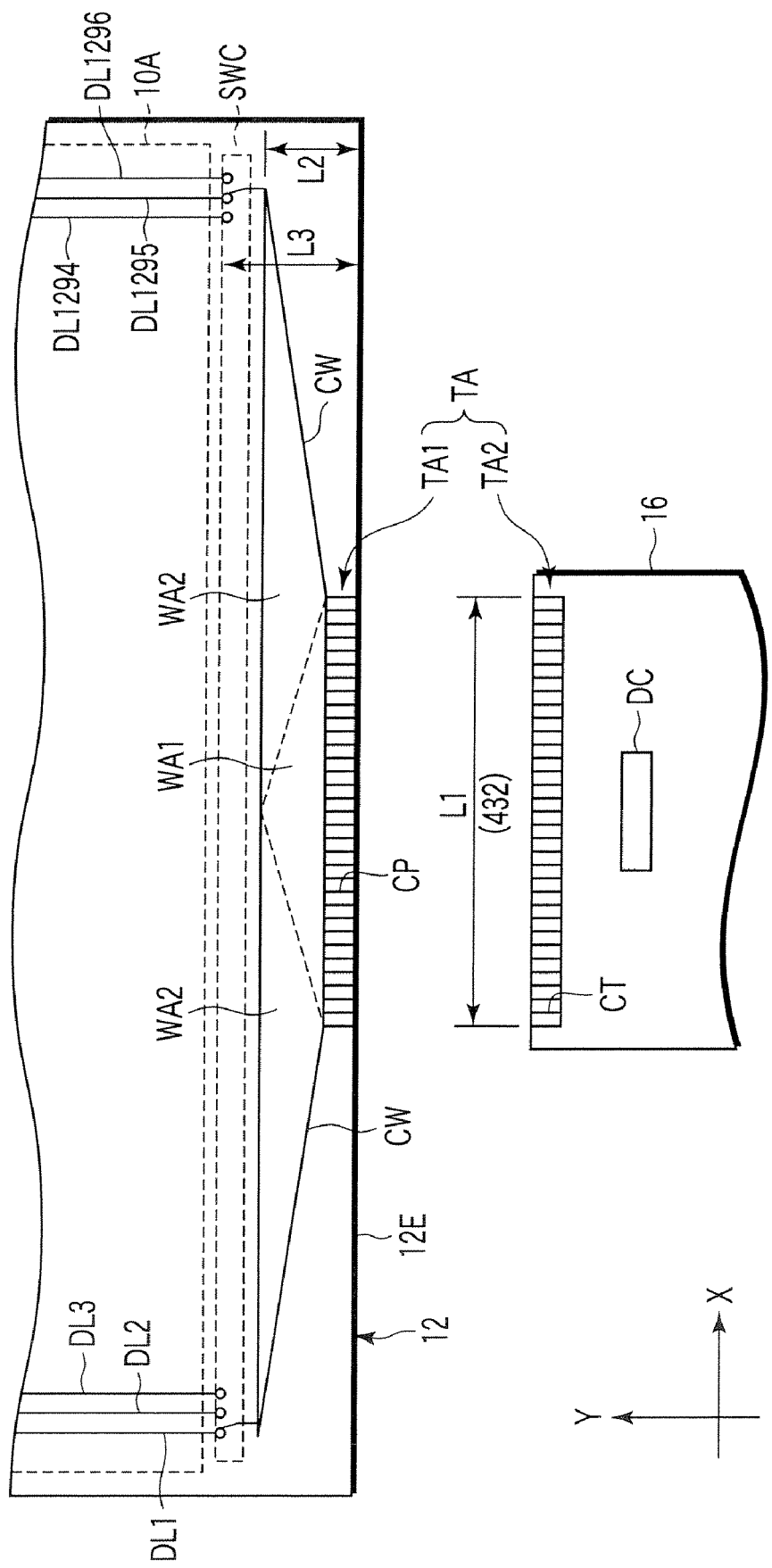
FIG. 7 is a view for describing a liquid crystal display device according to a Comparative Example for comparison with the embodiment shown in FIG. 4.

In the liquid crystal display device according to the Comparative Example, like the device shown in FIG. 6, the connection wiring lines CW of the array substrate 12 are connected to the signal lines DL via the switch circuit SWC. Specifically, as shown in FIG. 7, 432 connection wiring lines CW are connected to 1296 signal lines DL via the switch circuit SWC.

In the first connection section TA1, 432 connection pads CP are arranged with a pitch of 80 μm. In the second connection section TA2 of the flexible board 16, the connection terminals CT are arranged with the same pitch as the pitch of the connection pads CP on the first connection section TA1. In this Comparative Example, except for the above-described points, the liquid crystal display panel 10 has the same structure as the display panel 10 shown in FIG. 1, so the common parts are denoted by like reference numerals and a description thereof is omitted.

In this case, the Y-directional length L2 of each of the first wiring region WA1 and second wiring region WA2 was 5.9 mm, and the Y-directional length L3 between the edge portion 12E of the array substrate 12 and the effective display section 10A was about 6.4 mm.

Specifically, in the Example of the invention, compared to the Comparative Example, the Y-directional length L2 of each of the first wiring region WA1 and second wiring region WA2 was successfully reduced by 10%, and as a result the Y-directional length L3 between the edge portion 12E of the array substrate 12 and the effective display section 10A could be reduced by 9.4%. Thus, this Example can provide the liquid crystal display device which enables reduction in size of a picture-frame-shaped region of the liquid crystal display panel 10 and prevents defective connection of the flexible board 16.

The present invention is not limited directly to the above-described embodiments. In practice, the structural elements can be modified without departing from the spirit of the invention.

In the liquid crystal display device according to the embodiment, the invention has been applied to the arrangement of connection wiring lines that are connected to the signal lines. Alternatively, the invention may be applied to the arrangement of the scanning lines. In this case, too, the same advantageous effect as with the above-described embodiment can be obtained.

Figure 3D:
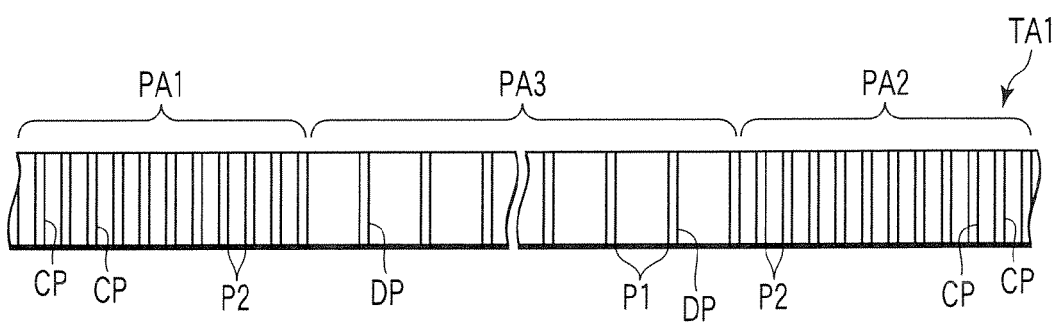
FIG. 3D shows in detail another example of the structure of the connection part of the array substrate shown in FIG. 2.
Figure 5B:
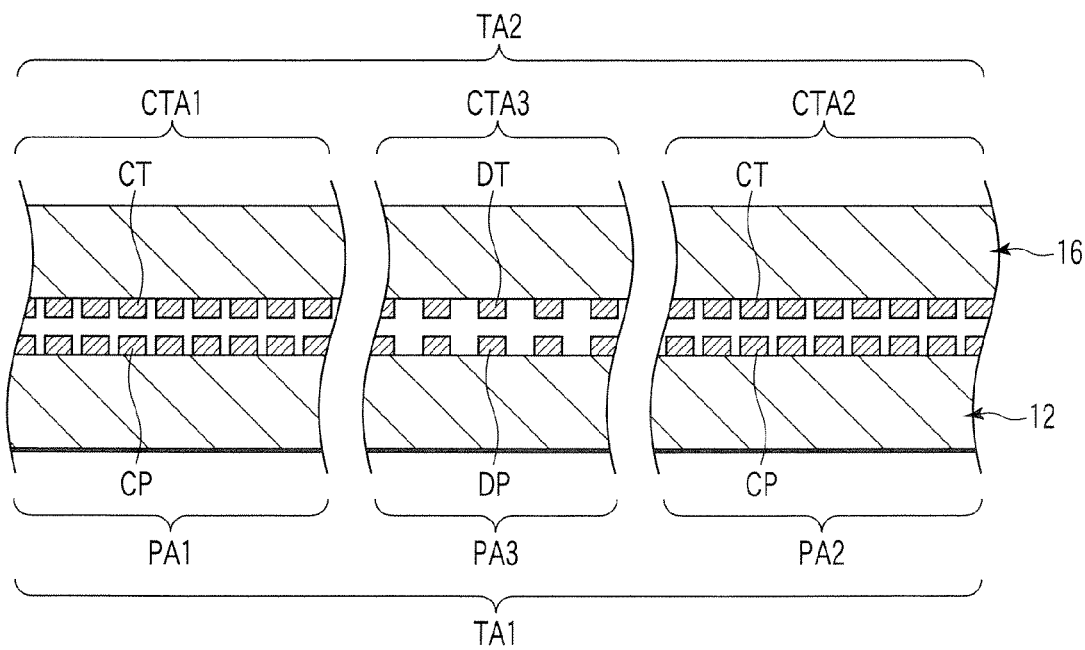
FIG. 5B is a cross-sectional view, taken along line A-A in FIG. 1, showing another example of the cross-sectional structure of the liquid crystal display panel shown in FIG. 4.

In the liquid crystal display device according to the embodiment, each of the pitch of the connection pads CP and the pitch of the dummy pads DP is 65 μm. However, the pitch of the dummy pads DP may be different from the pitch of the connection pads CP. For example, as shown in FIG. 3D and FIG. 5B, the dummy pads DP may be arranged with the pitch P1 and the connection pads CP may be arranged with the pitch P2 (P1>P2). In this case, too, the same advantageous effect as with the above-described embodiment can be obtained.

Various inventions can be made by properly combining the structural elements disclosed in the embodiments. For example, some structural elements may be omitted from all the structural elements disclosed in the embodiments. Furthermore, structural elements in different embodiments may properly be combined.

What is claimed is:

1. A display device comprising:
    a display panel which includes an effective display section on which an image is displayed;
    a driving signal source which supplies a driving signal to the effective display section;
    a connection part at which the display panel and the driving signal source are connected; and
    a plurality of connection wiring lines which connect the connection part and the effective display section,
    the connection part comprising:
        a first connection section including at least two connection pad groups which are composed of connection pads that are connected to the effective display section via the connection wiring lines, and a dummy pad group which is disposed between the at least two connection pad groups and is composed of dummy pads; and
        a second connection section including connection terminal groups which are composed of connection terminals corresponding to the connection pads, and a dummy terminal group which is composed of dummy terminals corresponding to the dummy pads.

2. The display device according to claim 1, wherein a pitch of arrangement of the dummy pads is equal to, or greater than, a pitch of arrangement of the connection pads.

3. The display device according to claim 1, wherein the effective display section includes a plurality of signal supply lines which supply signals to display pixels, and a switch circuit which switches and connects the plurality of signal supply lines to the connection wiring lines, and
    the switch circuit includes switching elements which are formed by using polysilicon.

4. The display device according to claim 1, wherein the display panel includes a pair of mutually opposed substrates, and a liquid crystal composition which is held between the pair of substrates.

* * * * *